(12) United States Patent
Pionke et al.

(10) Patent No.: US 8,317,233 B2
(45) Date of Patent: Nov. 27, 2012

(54) TUBE COUPLING APPARATUS HAVING LIQUEFIABLE METAL SEALING LAYER

(75) Inventors: Lawrence J. Pionke, St. Charles, MO (US); Michael H. Curry, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 12/201,449

(22) Filed: Aug. 29, 2008

(65) Prior Publication Data
US 2010/0055489 A1  Mar. 4, 2010

(51) Int. Cl.
*F16L 55/00* (2006.01)
*F16L 25/00* (2006.01)

(52) U.S. Cl. ......... 285/41; 285/10; 285/289.5; 285/329; 228/254

(58) Field of Classification Search ............ 285/41, 285/289.1–289.5, 21.1, 381.1, 381.2, 10, 285/11, 329, 187; 228/254
See application file for complete search history.

(56) References Cited

U.S. PATENT DOCUMENTS

| | | | | |
|---|---|---|---|---|
| 3,207,524 A | * | 9/1965 | Trbovich | 277/647 |
| 3,272,521 A | * | 9/1966 | McNenny | 277/467 |
| 3,567,257 A | * | 3/1971 | Nowosadko | 285/289.5 |
| 3,948,434 A | * | 4/1976 | Rothchild | 228/234.3 |
| 4,261,584 A | * | 4/1981 | Browne et al. | 277/647 |
| 4,477,087 A | * | 10/1984 | Sutter et al. | 277/644 |
| 4,844,322 A | * | 7/1989 | Flowers et al. | 228/119 |
| 5,123,678 A | * | 6/1992 | Froger et al. | 285/110 |
| 5,380,019 A | * | 1/1995 | Hillery et al. | 277/626 |
| 5,400,951 A | * | 3/1995 | Shiroyama et al. | 228/168 |
| 5,529,348 A | * | 6/1996 | Wasserman et al. | 285/288.6 |
| 5,560,661 A | * | 10/1996 | Babel et al. | 285/382 |
| 6,575,349 B2 | * | 6/2003 | Van Esch | 228/119 |
| 2005/0218196 A1 | * | 10/2005 | Mayers | 228/254 |

OTHER PUBLICATIONS

SAE AS85421/1: General Specification for Separable Fluid System Beam Seal Tube Fittings, issued Feb. 2002, 5 pages.
SAE AS4209: Aerospace Standard for Beam Seal Fitting, issued Oct. 1992, revised Mar. 1997, 2 pages.
NASA Standard Part MC 252 Metallic Boss Seal, appv'd Jun. 28, 1962, revised Oct. 1, 1962, 2 pages.

* cited by examiner

*Primary Examiner* — James Hewitt
(74) *Attorney, Agent, or Firm* — Harness, Dickey & Pierce, P.L.C.

(57) ABSTRACT

A coupling apparatus that may have a first component having a first sealing surface and a second component having a second sealing surface. The first and second sealing surfaces are in facing relationship with one another when the first and second components are coupled together. One of the first and second sealing surfaces has a metallic film layer that transforms into a liquefied metal layer when the metallic film layer is exposed to a temperature that exceeds a melting temperature of a metal from which the metallic film layer is formed. The liquefied metal layer forms a seal between the sealing surfaces.

15 Claims, 7 Drawing Sheets

TUBE COUPLING APPARATUS HAVING LIQUEFIABLE METAL SEALING LAYER

STATEMENT OF GOVERNMENT RIGHTS

The subject matter of the present disclosure was made with support from the U.S. Government under Contract No. F33615-98-9-2880 awarded by the U.S. Air Force. The U.S. Government has certain rights in the subject matter disclosed herein.

FIELD

The present disclosure relates to metal-to-metal couplings, and more particularly to a metal-to-metal coupling with a localized liquid metal film that is able to extend the operational temperature of high temperature metal-to-metal fittings used to join tube and pipe sections carrying high temperature gas flows.

BACKGROUND

The statements in this section merely provide background information related to the present disclosure and may not constitute prior art.

Mechanical joints between sections of metallic tubing are necessary in order to provide for ease of joining during assembly of high pressure gas lines. For applications involving gas temperatures less than 1300° F., sections can be joined using metal fittings that rely on elastic deflection of internal sealing surfaces. Such "dynamic seal" fittings cannot be used at temperatures above 1300° F. because the internal sealing surfaces plastically deform and permanently set into their deflected shape, loosing their elasticity and ability to provide a leak-free seal.

To achieve leak-free joints in high temperature (i.e., above 1300° F.) pressurized gas lines, it has typically been necessary to resort to fusion welding. Use of conventional fusion welding operations to join tube segments requires sufficient 360° access to the full circumference of the tube joint to accommodate manual or automated orbital fusion welding equipment. In applications that require dense packing to conserve volume and minimize weight, providing such access often results in suboptimum packing designs that unduly penalize the performance of end items that are weight and/or size critical. Examples of end items where low weight and size are critical include high performance aircraft and high performance missile systems and propulsion systems such as turbine engines.

SUMMARY

In one aspect the present disclosure relates to a coupling apparatus that may include: a first component having a first sealing surface; a second component having a second sealing surface, the first and second sealing surfaces being in facing relationship with one another when the first and second components are coupled together; and one of the first and second sealing surfaces having a metallic film layer that transforms into a liquefied metal layer when the metallic film layer is exposed to a temperature that exceeds a melting temperature of metal from which the metallic film layer is formed, the liquefied metal layer forming a seal between the sealing surfaces.

In another aspect the present disclosure relates to a dynamic beam seal coupling apparatus that may include: a first component having a first, generally planar sealing surface; a second component having a second, generally planar sealing surface, the first and second sealing surfaces being arranged in facing relationship with one another when the first and second components are coupled together; and one of the first and second sealing surfaces having a metallic film layer deposited thereon that transforms into a liquefied metal layer when the metallic film layer is exposed to a temperature that exceeds a melting temperature of a metal from which the metallic film layer is formed, the liquefied metal layer forming a liquid seal between the sealing surfaces.

In another aspect the present disclosure relates to a method for forming a fluid tight seal. The method may comprise: providing a first component having a first sealing surface; providing a second component having a second sealing surface; and coating one of the first and second sealing surfaces with a metallic film layer adapted to transform into a liquefied metallic layer when a temperature of the one of the first and second surfaces exceeds a melting temperature of a metal used to form the metallic film layer, the liquefied metallic layer helping to form a pressure tight seal between the sealing surfaces.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
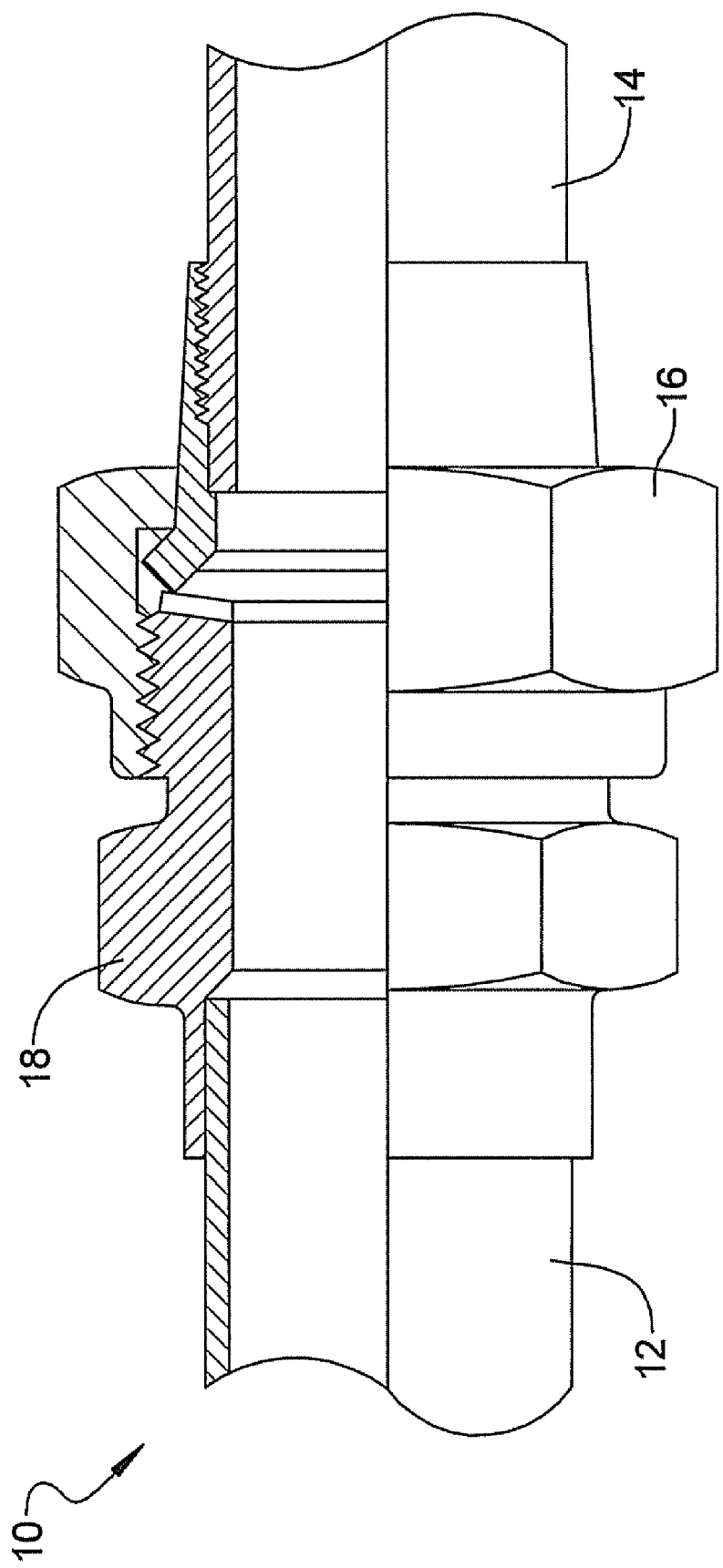
FIG. 1 is a partial side cross sectional view of a dynamic beam seal coupling apparatus of the present disclosure that incorporates a metallic film layer to aid in sealing the mating surfaces of the coupling together while a high temperature, high pressure, gas is flowing through the apparatus.

The following description is merely exemplary in nature and is not intended to limit the present disclosure, application, or uses. It should be understood that throughout the drawings, corresponding reference numerals indicate like or corresponding parts and features.

Referring to FIG. 1, a dynamic beam seal apparatus 10 including a metallic film layer is shown. The beam seal apparatus 10 is illustrative of merely one form of coupling device with which the teachings of the present disclosure may be used to form a high temperature, high pressure seal joining two conduits that carry a high temperature, high pressure gas. The dynamic beam seal apparatus 10 typically includes a first coupling component 12 and a second coupling component 14 that are coupled together by a threaded member 16 associated with one of the components, in this example component 14, that engages a threaded end 18 of component 12. The first and second components 12 and 14 may be made from any materials that are suitable for use in a high temperature, high pressure coupling device, but in one example the components 12 and 14 are made from Inconel 718.

Figure 2:
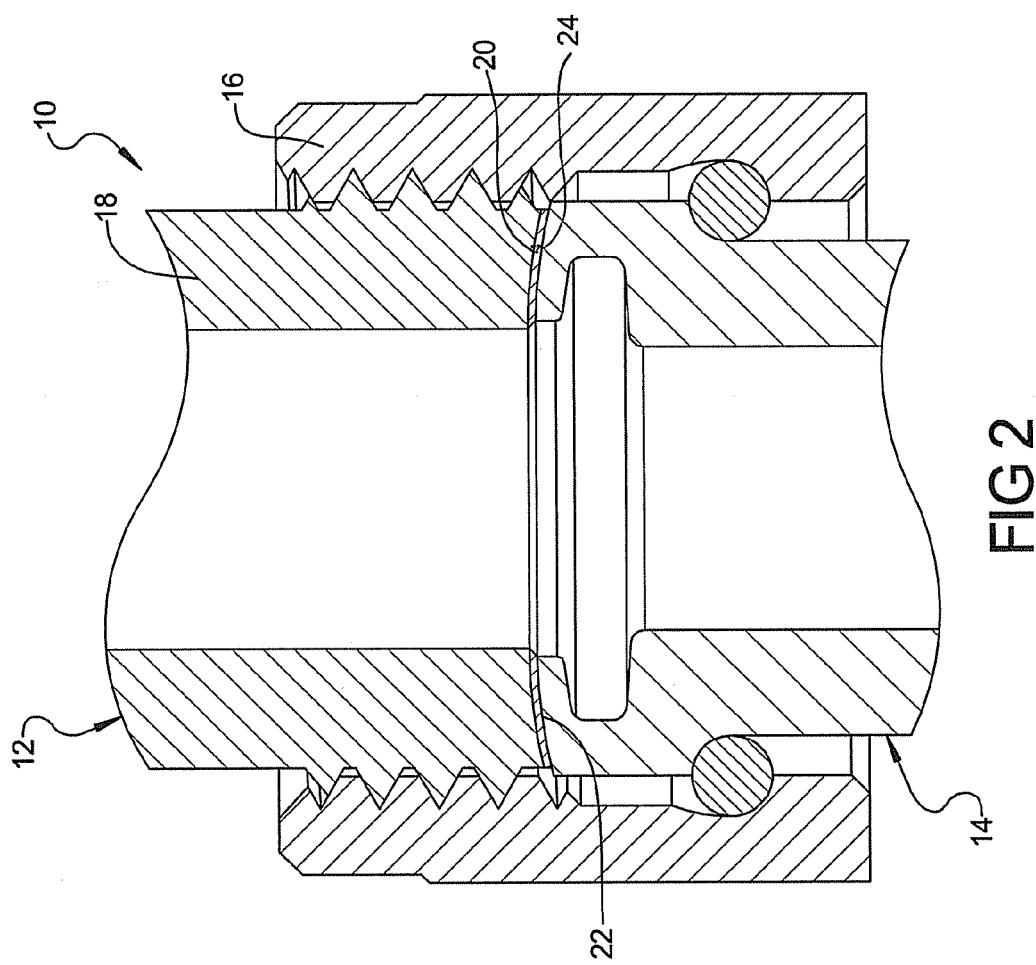
FIG. 2 is an enlarged portion showing where a metallic layer may be deposited on one of the components of the beam seal coupling apparatus of FIG. 1.
Figure 3:
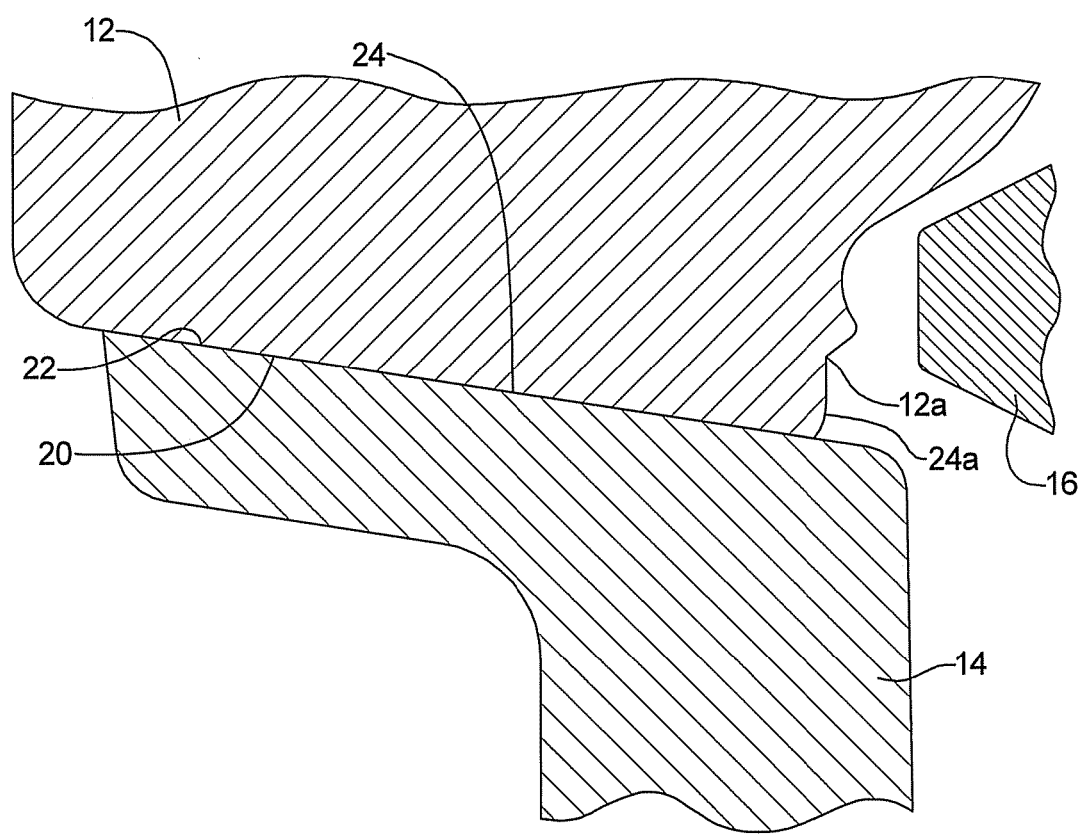
FIG. 3 is a magnified view of a portion of the dynamic beam seal coupling apparatus of FIG. 2 showing how surface tension effects have caused the liquefied metal film to wick and partially flow out from between the mating sealing surfaces after being exposed to a temperature that exceeded the melting temperature of the metallic film layer.

Referring to FIGS. 2 and 3, an illustration of an enlarged portion of the sealing surfaces of the components 12 and 14 is shown. First component 12 includes a first sealing surface 20 while second component 14 includes a second sealing surface 22. One of the two sealing surfaces includes a metallic film layer 24 deposited thereon, and in this example that surface is sealing surface 20 of the first component 12. However, it will be recognized that the metallic film layer 24 may just as readily be used on the second sealing surface 22. The metallic film layer 24 may comprise a variety of metals such as gold, silver and copper, as well as other commercially available alloys used in well known brazing practices. The metallic film layer 24 may be deposited onto the sealing surface 20 using well known electroplating techniques. Alternatively, an alloyed metallic film layer may be formed using well known physical vapor deposition or sputtering techniques. The metallic film layer 24 may also vary in thickness to suit specific applications, but in most instances a suitable thickness is expected to be between about 0.001 inch to 0.002 inch (0.0254 mm-0.0508 mm). The specific metallic material chosen for the metallic film layer 24 also should be able to liquefy in response to the temperature of the gas that will be flowing through the coupling apparatus 10 during normal operation of the coupling apparatus 10. For gold, the melting temperature is about 1948° F. and for silver it is about 1761° F. Prior to the electroplating of the metallic film layer 24 on to the sealing surface 20, it is also preferred that the sealing surface 20 be polished to a surface finish of about 8-32 RA.

During the first few seconds of initial operation of the coupling apparatus 10, the heat from the high temperature gas flowing through the apparatus 10 will fuse the electroplated metallic film layer 24 to the sealing surface 20. Thereafter, as the hot gas flowing through the coupling apparatus 10 heats up the sealing surfaces 20 and 22 past the melting temperature of the metallic film layer 24, the metallic film layer transforms into a liquid state (i.e., liquefies). The hot gas flowing through the apparatus 10 is a high pressure gas typically under a pressure of at least about 500 PSI, and more typically about 680 PSI to about 800 PSI, or possibly even higher. One might expect the liquefied metal to simply squirt out from between the sealing surfaces 20 and 22 when exposed to a hot flow gas at such high pressure. However, laboratory tests using electroplated gold have shown that even pressures as high as 800 PSI are insufficient to overcome the capillary forces that hold the molten metal of the metallic film layer 24 in the gap between the two sealing surfaces 20 and 22. Thus, the liquefied metallic film layer forms an effective seal between the sealing surfaces 20 and 22 in a matter of just a few seconds after being exposed to the hot, high pressure gas flow.

With brief reference to FIG. 3, the metallic film layer 24 is shown after it has cooled after being exposed to a high temperature, high pressure gas flow. It will be noted that the great majority of the metal of the metallic film layer 24 is still present on the sealing surface 20, although a small portion 24a has wicked out from between the surfaces 20 and 22 on to an inner surface 12a of component 12.

Figure 4:
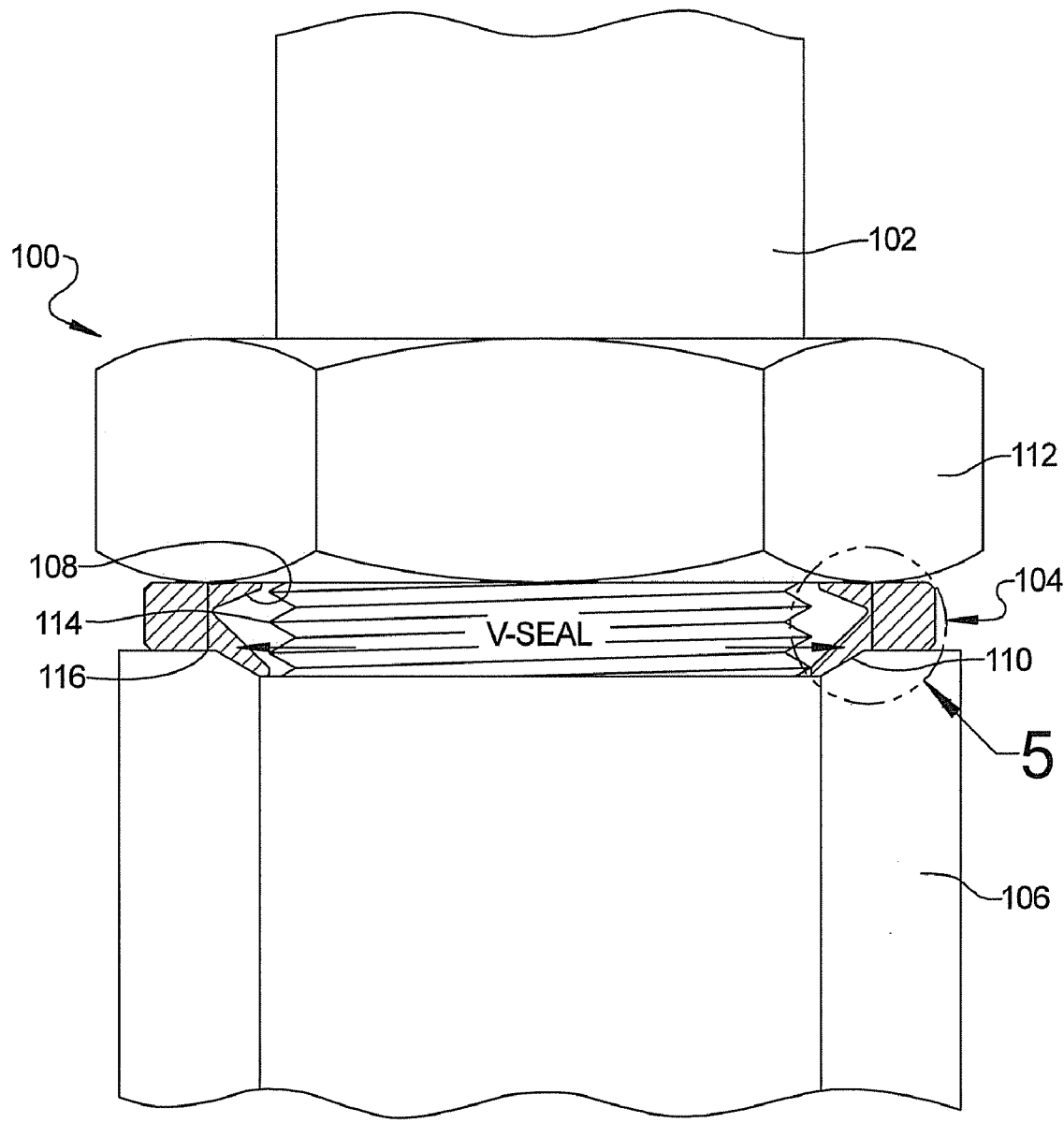
FIG. 4 is a side view of a three piece coupling apparatus incorporating a V-ring seal component that includes a metallic film layer thereon.

Referring now to FIG. 4 a three piece coupling apparatus 100 in accordance with another embodiment of the present disclosure is provided. The apparatus 100 includes a first component 102, a second component 104 in the form of a V-ring seal component, and a third component 106. The V-ring seal component 104 is interposed between sealing surface 108 of the first component 102 and sealing surface 110 of the third component 106. The sealing surfaces 108 and 110 generally face each other. A male threaded member 112 of the first component 102 engages a female threaded portion 114 of the third component 106 to clamp the V-ring seal component 104 tightly between the sealing surfaces 108 and 110. The V-ring seal component 104 in this example is a Haynes 188 seal, although it will be appreciated that essentially any form of sealing component that is able to be plated with a metallic film layer, capable of sustaining the hot, high pressure gas, and able to be held between two adjacent sealing surfaces, could be used as the sealing component that interfaces with the two sealing surfaces 108 and 110.

In this example the V-ring seal component 104 has its entire outer surface coated with a metallic film layer 116, although it will be appreciated that only the areas of the V-ring seal component 104 that physically abut the sealing surfaces 108 and 110 require the metallic film layer to be formed thereon. Alternatively, the sealing surfaces 108 and 110 may be coated with a metallic film layer. The metallic film layer 116 may be gold, silver, copper, or other commercially available alloys used in well known brazing practices and be of a thickness as described above.

Figure 5:
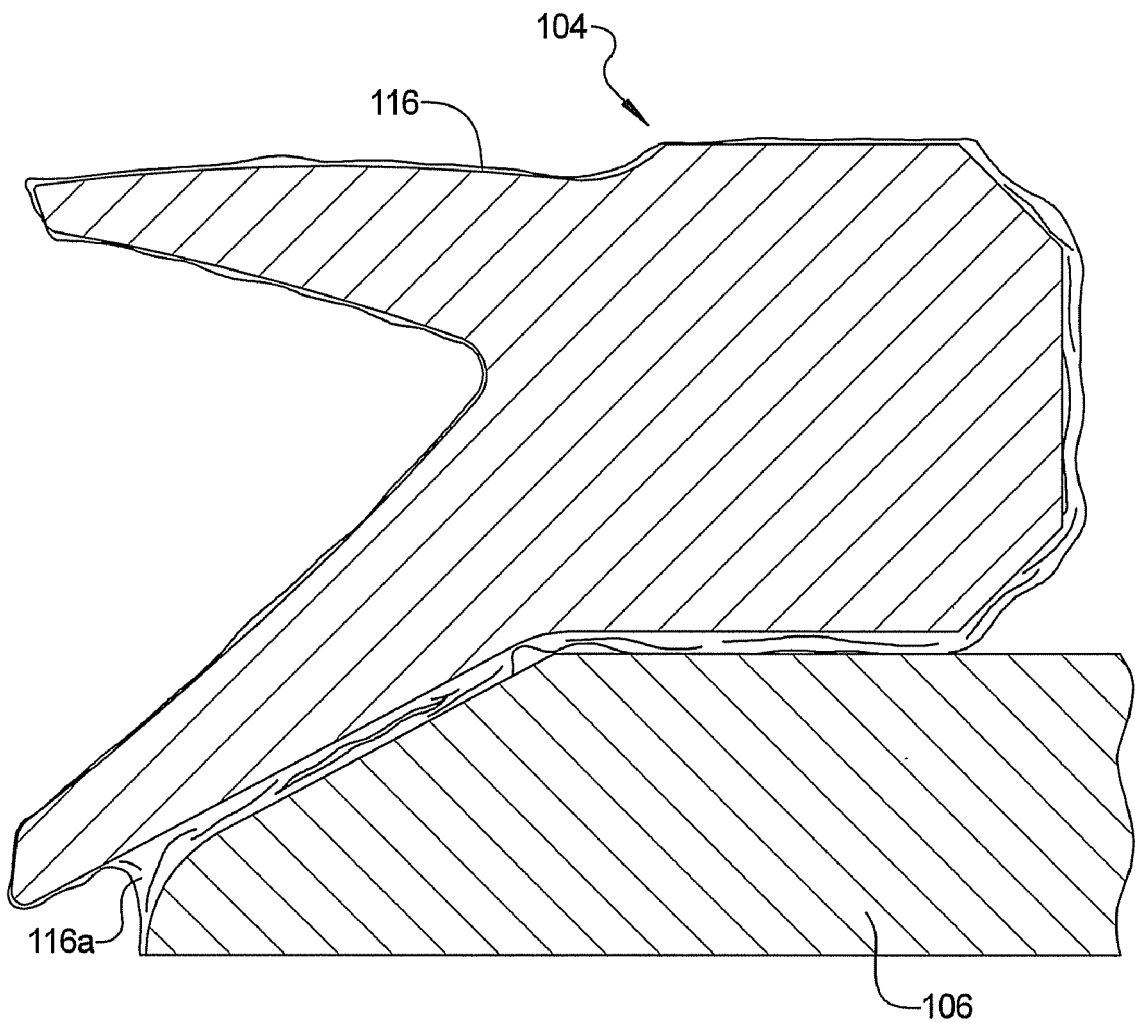
FIG. 5 is a highly enlarged photograph of a circled portion 5 of the V-ring seal shown in FIG. 4 after the V-ring seal has been coated with a metallic coating and then exposed to a temperature sufficient to melt the metallic film layer, and evidencing flow of the liquefied metal after 160 second exposure to a 2000° F., 680 PSI hot gas flow through the sealing apparatus containing the V-ring seal.

The apparatus 100 operates in essentially the same manner as apparatus 10. As hot, high pressure gas begins to flow through the apparatus 100 the metallic film layer 116 fuses to the outer surface of the V-ring seal component 104. Thereafter as the temperature of the V-ring seal component 104 passes the melting temperature of the metallic film layer 116, the metallic film layer liquefies to form an airtight, pressure tight seal between the sealing surfaces 108 and 110 of the first and third components 102 and 106. FIG. 5 illustrates an enlarged portion of the metallic film layer 116 corresponding to circled area 5 in FIG. 4 after the metallic film layer 116 has been exposed to a hot gas flow. A portion of the material of the metallic film layer 116 has migrated into a peripheral area 116a to form a meniscus, thus indicating that metallic film layer 116 had previously liquefied and that some small degree of flow has taken place.

Figure 6:
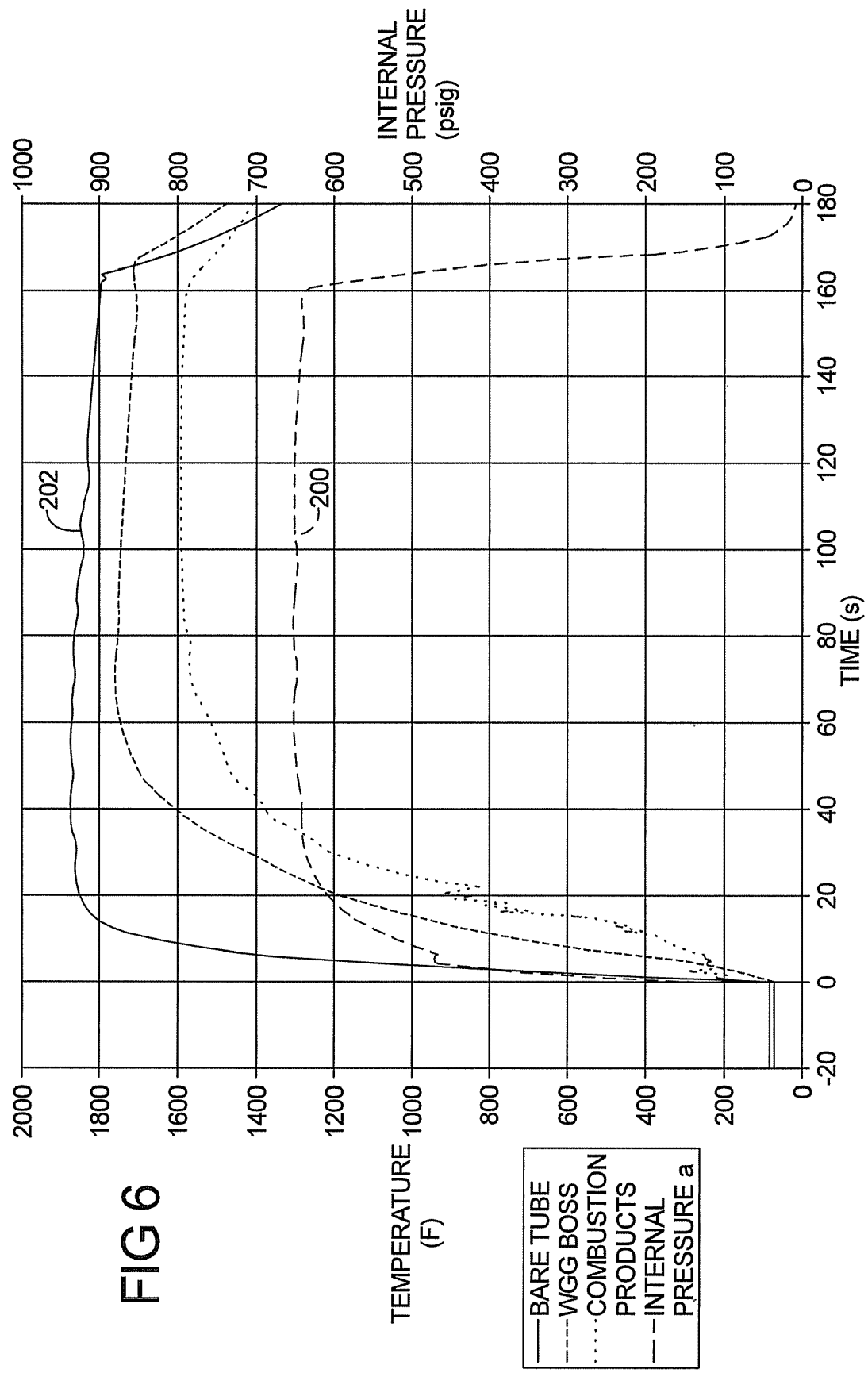
FIG. 6 illustrates a series of graphs showing temperature and internal pressure versus time for a hot gas flow test performed on a dynamic beam seal incorporating a metallic coating to show a relatively constant pressure being maintained over time while the temperature of the seal components was maintained above about 1800° F.

Referring briefly to FIG. 6, laboratory test data showing the temperature-pressure-time history for a tube containing both dynamic beam and V-ring seals is shown. As will be noted, the internal pressure of the tube, indicated by curve 200, stayed essentially constant—pressure tight and leak-free—while the bare tube temperature indicated by curve 202 stayed above the melting temperature of the metallic film layer. The other two curves shown in FIG. 6 represent data acquired from temperature sensors mounted on the test apparatus that is unrelated to the present disclosure.

Figure 7:
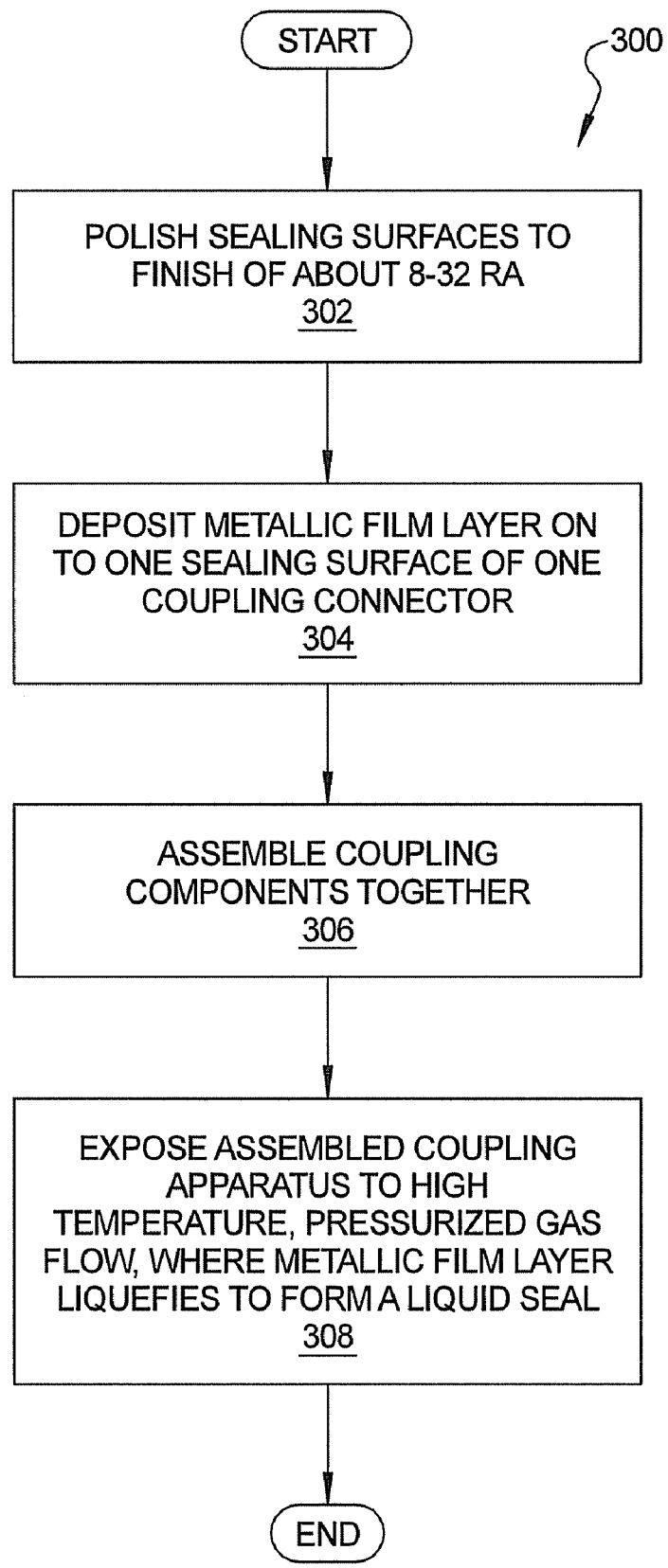
FIG. 7 is a flowchart setting forth various operations that may be used in forming a coupling device in accordance with the teachings of the present disclosure.

Referring to FIG. 7, a flowchart 300 is shown that sets forth operations in forming a coupling apparatus with a metallic film layer on one of its sealing surfaces. It will be understood that the flowchart 300 applies to both two piece dynamic beam seal coupling devices and three piece coupling devices making use of a V-ring seal component. At operation 302 the sealing surfaces of the apparatus are polished to a surface finish of about 8-32 RA. At operation 304 a metallic film layer is deposited, by electroplating or other suitable techniques, onto one of the sealing surfaces. At operation 306 the components of the apparatus are assembled. At operation 308 the assembled apparatus is exposed to a high temperature, high pressure gas flow where the metallic film layer liquefies and forms a pressure tight seal between the sealing surfaces.

The present disclosure is expected to find utility in any device that makes use of a metal-to-metal contacting sealing surface. The various embodiments described herein are able to provide leak free couplings for hot gas flows having a pressure of up to 800° F. and potentially even higher. The ability to provide a liquid metal seal eliminates the need for extra space around the circumference of the coupling to facilitate 360° welding of the sealing surfaces, and therefore can significantly reduce the packaging and space requirements for systems that require the use of couplings that can handle extremely high temperature, pressurized gas flows. The various embodiments are also expected to help significantly reduce the weight of subsystems that require high temperature/pressure couplings due to greater packing efficiency.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A coupling apparatus comprising:
   a first tubular component having a first sealing surface;
   a second tubular component having a second sealing surface, said first and second sealing surfaces being in facing relationship with one another when said first and second components are coupled together;
   one of said first and second sealing surfaces having a metallic film layer having a thickness that transforms from a first, solid state when a pressurized, heated fluid is not flowing through the tubular components, into a second, liquefied metal layer only after said metallic film layer is heated by the pressurized, heated fluid flowing through said apparatus to a temperature that exceeds a melting temperature of a metal from which said metallic film layer is formed, said thickness of said metallic film layer, once having turned into the liquefied metal layer, being sufficient to form a seal between said sealing surfaces, while said metallic film layer is maintained in a liquefied state by heat from said pressurized, heated fluid, as said pressurized, heated fluid flows through said coupling apparatus, and to remain disposed between said sealing surfaces when said pressurized, heated fluid is flowing under a pressure of at least approximately 500 pounds per square inch; and
   wherein said metallic film layer is applied by at least one of electroplating, physical vapor deposition and sputtering, onto its respective sealing surface.

2. The apparatus of claim 1, wherein said coupling apparatus forms a dynamic beam seal fitting.

3. The apparatus of claim 1, wherein said one of said sealing surfaces comprises a surface of a V-ring seal component.

4. The apparatus of claim 3, wherein a plurality of surfaces of said V-ring component are covered with said metallic film layer.

5. The apparatus of claim 1, wherein said metal of said metallic film layer comprises silver.

6. The apparatus of claim 1, wherein said metal of said metallic film layer comprises gold.

7. The apparatus of claim 1, wherein said metal of said metallic film layer comprises copper.

8. The apparatus of claim 1, wherein said metal of said metallic film layer comprises a brazeable alloy.

9. The apparatus of claim 1, wherein said first and second tubular components comprise tubular components adapted for use with a fluid having a pressure of at least about 500 pounds per square inch.

10. The apparatus of claim 1, further comprising a third component having a third sealing surface, and wherein said one of said first and second sealing surfaces having said liquefied metal film layer comprises a V-ring seal component, said V-ring seal component being disposed between said third component and the other one of said first and second tubular components.

11. A dynamic beam seal coupling apparatus comprising:
    a first tubular component having a first, generally planar sealing surface;
    a second tubular component having a second, generally planar sealing surface, said first and second sealing surfaces being arranged in facing relationship with one another when said first and second tubular components are coupled together;
    one of said first and second sealing surfaces having a metallic film layer deposited thereon that assumes a solid state prior to a pressurized, heated fluid of at least about 500 psi being flowed through the first and second tubular components, and only then transforms into a liquefied metal layer when said metallic film layer is exposed to said pressurized, heated fluid, and wherein said pressurized, heated fluid has a temperature that exceeds a melting temperature of a metal from which said metallic film layer is formed, said liquefied metal layer being sufficient to form a liquid seal between said sealing surfaces while said metallic film layer is maintained in a liquefied state by heat from said pressurized, heated fluid;
    wherein said metallic film layer has a thickness between greater than about 0.001 inch and up to about 0.002 inch, prior to transforming into said liquefied metal layer; and
    wherein said metallic film layer is electroplated onto said one of said first and second surfaces.

12. The apparatus of claim 11, wherein said metal of said metallic film layer comprises gold.

13. The apparatus of claim 11, wherein said metal of said metallic film layer comprises silver.

14. The apparatus of claim 11, wherein said metal of said metallic film layer comprises copper.

15. The apparatus of claim 11, wherein said metal of said metallic film layer comprises a brazeable alloy.

* * * * *